(12) United States Patent
Colston

(10) Patent No.: US 10,694,892 B2
(45) Date of Patent: Jun. 30, 2020

(54) INTERNAL CHIMNEY SYSTEM FOR GRILLS AND SMOKERS

(71) Applicant: Traeger Pellet Grills, LLC, Salt Lake City, UT (US)

(72) Inventor: Michael Colston, Salt Lake City, UT (US)

(73) Assignee: Traeger Pellet Grills, LLC, Salt Lake City, UT (US)

( * ) Notice: Subject to any disclaimer, the term of this patent is extended or adjusted under 35 U.S.C. 154(b) by 0 days.

(21) Appl. No.: 15/316,121

(22) PCT Filed: Sep. 8, 2016

(86) PCT No.: PCT/US2016/050771
§ 371 (c)(1),
(2) Date: Dec. 2, 2016

(87) PCT Pub. No.: WO2017/044619
PCT Pub. Date: Mar. 16, 2017

(65) Prior Publication Data
US 2018/0168397 A1 Jun. 21, 2018

Related U.S. Application Data

(60) Provisional application No. 62/216,151, filed on Sep. 9, 2015.

(51) Int. Cl.
*A47J 37/07* (2006.01)
*A47J 36/38* (2006.01)

(52) U.S. Cl.
CPC ........... *A47J 37/0786* (2013.01); *A47J 36/38* (2013.01); *A47J 37/0704* (2013.01)

(58) Field of Classification Search
CPC ..... A47J 37/0786; A47J 36/38; A47J 37/0704
USPC ........................................................ 99/400
See application file for complete search history.

(56) References Cited

U.S. PATENT DOCUMENTS 3,933,144 A * 1/1976 Bandy ................. A47J 37/0704
126/25 R
4,510,854 A * 4/1985 Robertson ............. A47J 37/042
126/21 A
6,142,066 A 11/2000 Anders
6,810,792 B1 * 11/2004 Knight .................... A47J 36/38
99/340

(Continued)

OTHER PUBLICATIONS

International Search Report for application No. PCT/US2016/050771 dated Dec. 20, 2016.

*Primary Examiner* — Lorne E Meade
*Assistant Examiner* — Kuangyue Chen
(74) *Attorney, Agent, or Firm* — TraskBritt

(57) ABSTRACT

A smoke circulating element includes a smoke retaining element and a smoke circulation opening adapted for directing smoke out of the smoke retaining element. The smoke retaining element has a plurality of panels at least partially bounding a smoke chamber. The smoke circulating element is contoured to fit the inner surface of a grilling device so that the inner surface and smoke circulating element cooperate to substantially enclose the smoke chamber. Smoke produced within the smoke chamber by a wood pellet fire pot escapes the smoke chamber through the upper disposed smoke circulation opening and is exhausted from the grilling device as it cools, settles, and escapes through a lower disposed exhaust opening.

19 Claims, 4 Drawing Sheets

(56) References Cited

U.S. PATENT DOCUMENTS

| | | | |
|---|---|---|---|
| 6,874,496 B2 * | 4/2005 | Waits | A23B 4/044 |
| | | | 126/1 D |
| 2013/0019760 A1 * | 1/2013 | West | A47J 37/0704 |
| | | | 99/340 |
| 2015/0164278 A1 * | 6/2015 | Kohler | A47J 37/0623 |
| | | | 99/340 |
| 2015/0257593 A1 * | 9/2015 | Hunt | A47J 37/0718 |
| | | | 99/446 |

* cited by examiner

INTERNAL CHIMNEY SYSTEM FOR GRILLS AND SMOKERS

CROSS-REFERENCE TO RELATED APPLICATIONS

The present invention is a 35 U.S.C. § 371 U.S. National Stage of PCT Application No. PCT/US16/50771, filed on Sep. 8, 2016, which claims the benefit of priority to U.S. Provisional Application No. 62/216,151, filed Sep. 9, 2015. The entire content of each of the aforementioned patent applications is incorporated herein by reference.

BACKGROUND

Technical Field

The present disclosure relates to systems, methods, and devices for grilling and/or smoking food products. In particular, the present disclosure relates to internal heat and smoke chimneys for wood pellet-fired grills and smokers and to systems and methods incorporating the same.

Related Technology

Grilling and smoking food products typically includes the use of a grilling device having an internal grilling compartment. When the lid is closed, the grilling device can retain heat and smoke within the internal grilling compartment to cook and smoke the food product. For a variety of reasons, grilling devices may also include a smoke or heat exhaust to release the smoke and heat from the internal grilling compartment and direct it upwards, away from the grilling device. Unfortunately, the exhaust often releases smoke and heat before they can be used efficiently. For instance, heated smoke may rise to the top of the internal grilling compartment and be released through the exhaust before it can infuse flavor into the food product. In some instances, this heated smoke may be more desirable than cooler smoke that may settle to the bottom of the internal grilling compartment. Heat may also be released before it can be used efficiently to cook the food product.

Accordingly, there are a number of disadvantages in grilling devices and systems that can be addressed.

BRIEF SUMMARY

Implementations of the present disclosure solve one or more of the foregoing or other problems in the art with systems, methods, and devices for improved heat and/or smoke distribution, as well as components and/or sub-components thereof. In particular, implementations of the present disclosure relate to a smoke circulation device adapted for efficiently circulating heat and/or smoke within the internal grilling compartment of a grilling device; specifically a pellet-fed smoker grill.

For example, one or more implementations of the present disclosure include a smoke circulation device having a smoke retaining element and a smoke circulation opening adapted for directing smoke out of the smoke retaining element. In some implementations, the smoke retaining element includes a top portion and a sidewall extending from the top portion. The top portion and the sidewall at least partially bounding a smoke chamber, which is in fluid communication with the smoke circulation opening. Further, some implementations include a chimney member in fluid communication with the smoke circulation opening. The chimney member can be adapted for directing smoke in a vertically upward direction.

One or more additional implementations of the present disclosure include a smoke circulation system that includes a grilling device having an internal grilling compartment, and a smoke circulating element disposed at least partially within the internal grilling compartment. The smoke circulating element can include a chimney member adapted for directing smoke in a vertically upward direction within the internal grilling compartment. The grilling device can include an at least partially circular cross-sectional configuration such that smoke circulates within the internal grilling compartment. In some cases, a portion of the smoke circulating element is contoured to correspond to a shape of the internal grilling compartment. Additionally, some implementations include an exhaust chute extending in a vertically upward direction from an exhaust opening.

Further implementations can include a method of preparing a food product in a grilling device. Exemplary methods can include placing the food product in the internal grilling compartment of the grilling device with a smoke circulating element disposed therein. Certain methods can also include producing smoke within the internal grilling compartment such that the smoke circulating element directs the smoke to circulate within the internal grilling compartment.

Additional features and advantages of exemplary implementations of the present disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the present disclosure can be obtained, a more particular description of the implementations briefly described above will be rendered by reference to specific implementations thereof which are illustrated in the appended drawings. For better understanding, the like elements have been designated by like reference numbers throughout the various accompanying figures. Understanding that these drawings depict only typical implementations of the invention and are not therefore to be considered to be limiting of its scope, the invention will be described and explained with additional specificity and detail through the use of the accompanying drawings in which.

DETAILED DESCRIPTION

Figure 1:
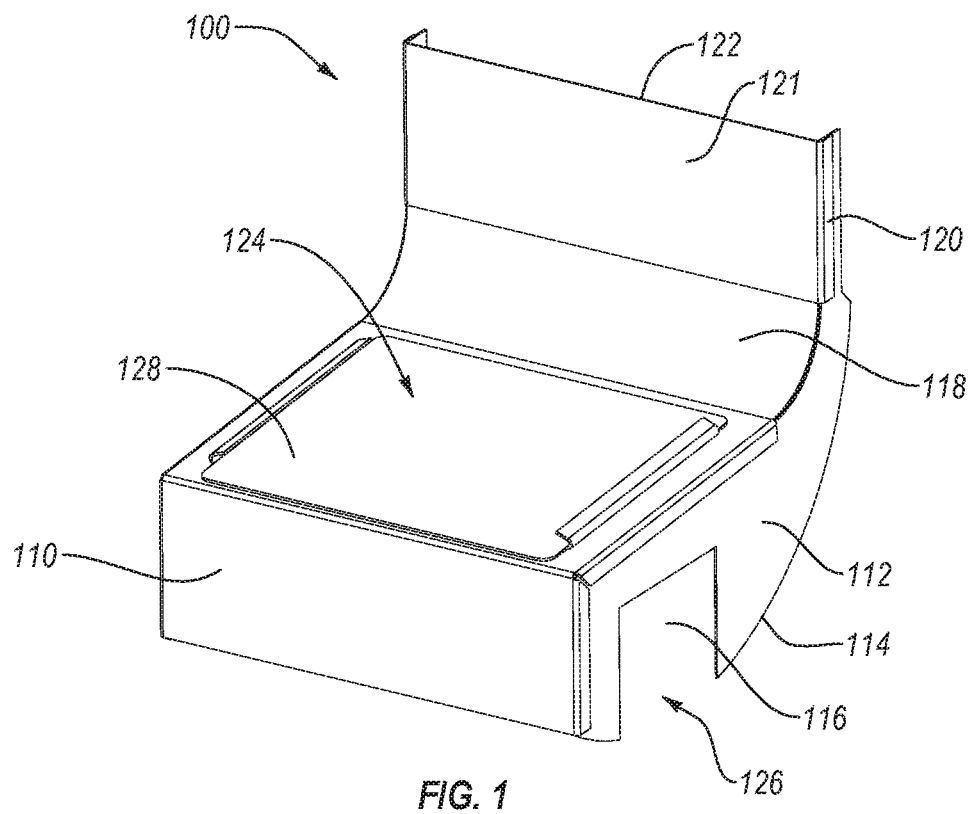
FIG. 1 illustrates a perspective view of a smoke circulating element according to an implementation of the present disclosure.

Before describing the present disclosure in detail, it is to be understood that this disclosure is not limited to the specific parameters of the particularly exemplified systems, apparatus, assemblies, products, devices, kits, methods, and/or processes, which may, of course, vary. It is also to be understood that much, if not all of the terminology used herein is only for the purpose of describing particular embodiments of the present disclosure, and is not necessarily intended to limit the scope of the disclosure in any particular manner. Thus, while the present disclosure will be described in detail with reference to specific configurations, embodiments, and/or implementations thereof, the descriptions are illustrative only and are not to be construed as limiting the scope of the claimed invention.

Various aspects of the present disclosure, including devices, systems, methods, etc., may be illustrated with reference to one or more exemplary embodiments or implementations. As used herein, the terms "exemplary embodiment" and/or "exemplary implementation" means "serving as an example, instance, or illustration," and should not necessarily be construed as preferred or advantageous over other embodiments or implementations disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

Furthermore, unless defined otherwise, all technical and scientific terms used herein have the same meaning as commonly understood by one of ordinary skill in the art to which the present disclosure pertains. While a number of methods, materials, components, etc. similar or equivalent to those described herein can be used in the practice of the present disclosure, only certain exemplary methods, materials, components, etc. are described herein.

It will be noted that, as used in this specification and the appended claims, the singular forms "a," "an" and "the" include plural referents unless the content clearly dictates otherwise. Thus, for example, reference to a "column" includes one, two, or more columns. Similarly, reference to a plurality of referents should be interpreted as comprising a single referent and/or a plurality of referents unless the content and/or context clearly dictate otherwise. Thus, reference to "columns" does not necessarily require a plurality of such columns. Instead, it will be appreciated that independent of conjugation; one or more columns are contemplated herein.

As used throughout this application the words "can" and "may" are used in a permissive sense (i.e., meaning having the potential to), rather than the mandatory sense (i.e., meaning must). Additionally, the terms "including," "having," "involving," "containing," "characterized by," as well as variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled", "attached", "connected," and/or "joined" are used to indicate either a direct association between two components or, where appropriate, an indirect association with one another through intervening or intermediate components. In contrast, when a component is referred to as being "directly coupled", "directly attached", "directly connected," and/or "directly joined" to another component, no intervening elements are present or contemplated. Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as "top," "bottom," "front," "back," "forward," "rear," "left," "right," "up," "down," "upper," "lower," "inner," "outer," "internal," "external," "interior," "exterior," "anterior," "posterior," "proximal," "distal," and the like can be used only for convenience and/or solely to indicate relative directions and/or orientations and may not otherwise be intended to limit the scope of the disclosure, including the specification, invention, and/or claims. According, such directional and/or arbitrary terms are not to be construed as necessarily requiring a specific order or position.

To facilitate understanding, like reference numerals have been used, where possible, to designate like elements common to the figures. Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and/or sub-elements of a parent element may each include separate letters appended to the element number. In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where two or more values, or a range of values (e.g., less than, greater than, at least, and/or up to a certain value, and/or between two recited values) is disclosed or recited, any specific value or range of values falling within the disclosed values or range of values is likewise disclosed and contemplated herein. Thus, disclosure of an illustrative measurement or distance less than or equal to about 10 units or between 0 and 10 units includes, illustratively, a specific disclosure of: (i) a measurement of 9 units, 5 units, 1 units, or any other value between 0 and 10 units, including 0 units and/or 10 units; and/or (ii) a measurement between 9 units and 1 units, between 8 units and 2 units, between 6 units and 4 units, and/or any other range of values between 0 and 10 units.

Various modifications can be made to the illustrated embodiments without departing from the spirit and scope of the invention as defined by the claims. Thus, while various aspects and embodiments have been disclosed herein, other aspects and embodiments are contemplated. It is also noted that systems, apparatus, assemblies, products, devices, kits, methods, and/or processes, according to certain embodiments of the present disclosure may include, incorporate, or otherwise comprise properties, features, components, members, and/or elements described in other embodiments disclosed and/or described herein. Thus, reference to a specific feature in relation to one embodiment should not be construed as being limited to applications only within said embodiment.

The headings used herein are for organizational purposes only and are not meant to be used to limit the scope of the description or the claims.

Embodiments of the present disclosure include systems, methods, and devices for grilling. In particular, certain implementations of the present disclosure relate to improved grills and grilling devices, as well as components and/or sub-components thereof and/or systems, methods, and apparatus incorporating the same. Some implementations of the present disclosure relate to grills having (an oven section with) an internal grilling compartment. The oven section can include a heating component (such as a fire pot) where a fuel source (such as wood pellets) can be ignited to produce heat and/or smoke at one or more temperature settings. The smoke can be circulated and/or otherwise distributed (within the internal grilling compartment) and/or released from the grilling device, oven section, and/or internal grilling compartment by one or more features of the present disclosure.

It will be appreciated that while reference is made to "grills," "grilling," "grilling devices," "grilling systems," and the like, the present disclosure extends to smoking, baking, roasting, braising, barbequing, and other food preparation methods, as well as devices and systems for warming, cooking, and/or preparing food products in any of the above-recited or other manners. Likewise, while reference is made to an "oven section," "cooking section," "heating area," and the like, the present disclosure also extends to various spaces suitable for heating, including open grilling surfaces (e.g., exposed to ambient air), closed kilns and ovens, heating spaces that can be selectively opened and closed, and the like. Accordingly, the particular features, configurations, design characteristics, and/or component (assemblies) described herein can be applicable to a variety of different fields of use extending beyond cooking or otherwise preparing food products. These different fields of use are also contemplated herein. Thus, reference to one or more "grills," "grilling," "grilling devices," "grilling systems," and the like, or one or more components thereof, should not be construed as being limited only to applications involving food grilling or grilling devices.

Grills of the present disclosure can be heated using a variety of fuels. For example, the disclosure extends to grills configured to burn propane and/or natural gas and grills configured to burn solid fuel (e.g., charcoal, briquettes, wood, etc.). In some embodiments, the grill is configured to use wood pellets as fuel. In addition, in some embodiments, grills according to the present disclosure are configured to be moveable (e.g., by means of wheel(s) or other moving element). In other embodiments, grills may be configured as stationary appliances and/or may be installed in a relatively permanent fashion (e.g., bolted or otherwise fastened to a wall and/or floor, or otherwise installed as part of a kitchen or cooking area). Furthermore, grills according to the present disclosure can be configured for outdoor use in some embodiments. For instance, certain regulations and/or safety concerns may require and/or recommend the use of combustion-style grills only in outdoor, open-air areas, away from structures, vegetation, and/or other potentially flammable materials.

In addition, certain embodiments may be described with reference to one or more metals or metal materials. As used herein, the term "metal" refers to a material that comprises an elemental metal or metal alloy, blend, or combination. Certain embodiments may also refer to heat and/or smoke distribution and/or circulation. It will be appreciated that such forms of directing and/or using heat and/or smoke can include active distribution and/or circulation and/or passive distribution and/or circulation.

It is further to be understood that some of the drawings included herewith, and which are referenced herein, are diagrammatic, schematic, and other representations of example embodiments, and are not limiting on the present disclosure. Moreover, while various drawings are provided at a scale that is considered functional for some embodiments, the drawings are not necessarily drawn to scale for all contemplated embodiments. No inference should therefore be drawn from the drawings as to the necessity of any scale. Rather, the proportionality, scale, size, shape, form, function, and/or other feature of the disclosed embodiments can be altered without necessarily departing from the scope of this disclosure (unless such feature is expressly described herein as essential).

Furthermore, as indicated above, in the exemplary embodiments illustrated in the figures, like structures will be provided with similar reference designations, where possible. Specific language will be used herein to describe the exemplary embodiments. Nevertheless it will be understood that no limitation of the scope of the disclosure is thereby intended. Rather, it is to be understood that the language used to describe the exemplary embodiments is illustrative only and is not to be construed as limiting the scope of the disclosure (unless such language is expressly described herein as essential).

Alterations and further modifications of the inventive features illustrated herein, and additional applications of the principles illustrated herein, which would occur to one skilled in the relevant art and having possession of this disclosure, are to be considered within the scope of this disclosure. Unless a feature is described as requiring another feature in combination therewith, any feature herein may be combined with another feature of a same or different embodiment disclosed herein. Furthermore, various well-known aspects of illustrative systems, methods, apparatus, and the like are not described herein in particular detail in order to avoid obscuring aspects of the example embodiments.

Certain implementations of the present disclosure include systems, methods, and/or devices for improved heat and/or smoke distribution, as well as components and/or sub-components thereof. In particular, implementations of the present disclosure relate to a smoke circulation device adapted for efficiently circulating heat and/or smoke within the internal grilling compartment of a grilling device; specifically a pellet-fed smoker grill. For example, one or more implementations of the present disclosure include a smoke circulation device having a smoke retaining element and a smoke circulation opening adapted for directing smoke out of the smoke retaining element.

In at least one embodiment, the smoke circulation device (or smoke retaining element thereof) can be structurally configured and/or contoured to form a smoke chamber when disposed within the internal grilling compartment of a grilling device. For instance, the smoke circulation device, smoke retaining element, or other component thereof can have a shape and/or configuration that corresponds to the shape and/or configuration of the inner surface of the (rounded and/or circular) sidewall that at least partially bounds the internal grilling compartment. Accordingly, when coupled to and/or placed or fitted against the inner surface of the sidewall, the smoke circulation device (or smoke retaining element thereof) can collect and/or temporarily trap heat and/or smoke between the inner surface of the sidewall and the smoke circulation device (or smoke retaining element thereof).

In some embodiments, the smoke circulation device can be disposed about a heating element (e.g., a fire pot). For instance, the smoke circulation device can be disposed within the grilling device, oven section, and/or internal grilling compartment such that the heating element is disposed at least partially within the smoke retaining element and/or smoke chamber. Accordingly, heated air and/or smoke generated by means of the heating element can be collected by and/or in the smoke retaining element and/or smoke chamber.

The smoke chamber can also be in fluid communication with the smoke circulation opening such that heated air and/or smoke disposed and/or collected therein can be distributed, circulated, and/or otherwise dispersed within and/or throughout the internal grilling compartment by means of the smoke circulation opening. For instance, the smoke circulation opening can be disposed vertically above the smoke retaining element and/or smoke chamber such that the heat and/or heated smoke rises (via natural convection) and/or escapes out of the smoke retaining element via the upper smoke circulation opening. The heat and/or smoke can move through the internal grilling compartment in an at least partially circular flow pattern in one or more embodiments. Some embodiments can also include an air moving element, such as a fan, for inducing forced air circulation within the internal grilling compartment.

In at least some embodiments, the smoke circulation opening can be disposed in a chimney element extending from the smoke retaining element. In some embodiments, the chimney element can be in fluid communication with the smoke circulation opening and/or the smoke chamber. The chimney element can also be adapted for directing smoke in a vertically upward direction in certain embodiments. The chimney element (or smoke circulation opening) can be disposed in the rear of the smoke circulation device (or smoke retaining element thereof) such that heat and/or smoke escapes the smoke chamber along the rear surface of the internal grilling compartment (or sidewall of the grilling device), opposite a forward disposed lid. In other embodiments, however, the chimney element (or smoke circulation opening) can be disposed elsewhere within the internal grilling compartment.

In certain embodiments, at least a portion of the chimney element can have a substantially vertical configuration. The substantially vertical configuration can correspond to a substantially vertical portion of the grilling device, oven section, internal grilling compartment, and/or (inner surface of the) side wall thereof. Accordingly, the grilling device, oven section, and/or internal grilling compartment can comprise a pill-shaped configuration (i.e., a substantially circular cross-sectional configuration having an elongated middle portion).

In other embodiments, the grilling device, oven section, and/or internal grilling compartment can comprise a barrel-shaped configuration (i.e., a substantially circular cross-section). Accordingly, at least a portion of the chimney element can have a curved, rounded, and/or substantially circular configuration. Such a configuration can correspond to a curved, rounded, and/or substantially circular portion of the grilling device, oven section, and/or internal grilling compartment in some embodiments. In at least one embodiment, the curved, rounded, and/or substantially circular portion of the chimney element can terminate at a vertical angle. Accordingly, the exhaust opening can be disposed at an end of the chimney element.

In some embodiments, air and/or smoke is exhausted, released, and/or removed from the grilling device, oven section, and/or internal grilling compartment by means of an exhaust opening. The exhaust opening can be disposed below a portion of the smoke circulation device, below the smoke circulation opening, below the chimney element, and/or below a food product disposed within the grilling device, oven section, and/or internal grilling compartment. In other embodiments, however, the exhaust opening can be disposed above one or more of the foregoing.

In at least one embodiment, circulating heated air and/or smoke may tend to rise to the upper portion of the grilling device, oven section, and/or internal grilling compartment. Accordingly, in some embodiments, cooled air and/or smoke can be exhausted from the grilling device, oven section, and/or internal grilling compartment by means of the exhaust opening (e.g., while heated air and/or smoke is retained in and/or circulated within the grilling device, oven section, and/or internal grilling compartment). It is noted that the downward draft of the air and/or smoke within the grilling device, oven section, and/or internal grilling compartment can improve heating and/or smoking of the food product, improve efficiency of the grilling device, and/or otherwise improve the functionality thereof.

Certain embodiments can also include an exhaust chute element extending from the exhaust opening. In some embodiments, the exhaust chute can extend vertically upward from the exhaust opening and/or can be disposed in a rear portion of the grilling device and/or oven section. It will be appreciated, however, that the exhaust chute can extend in any suitable direction and/or can be disposed in any suitable portion of the grilling device and/or oven section.

In some embodiments, the smoke circulation device and/or smoke retaining element can include an upper or top portion having an upper surface. In one or more embodiments, the upper surface can be disposed at an angle within the grilling device, oven section, and/or internal grilling compartment (e.g., relative to a horizontal plane). For instance, the upper surface can be slanted downward (from the rear of the grilling device, oven section, and/or internal grilling compartment towards the front thereof). It will be appreciated, however, that the upper surface can be slanted in any suitable direction and/or can be un-slanted. In some embodiments, a slanted configuration of the upper surface can accommodate a slanted drip tray disposed above the upper surface within the grilling device, oven section, and/or internal grilling compartment.

In some embodiments, the top portion can comprise a frame element having an access opening extending therethrough and/or through the upper surface. In certain embodiments, the top portion can also include a removable access panel. The access panel can cover the access opening in the top portion and/or upper surface of the smoke circulation device, smoke retaining element, and/or upper surface. In some embodiments, the access opening can provide access to the heating element or other component(s) disposed beneath the upper surface and/or within a portion of the smoke circulation device, smoke retaining element, and/or smoke chamber. In particular embodiments, the access opening can provide access to one or more wood pellet fire pot components, such as a hot rod for heating and/or igniting the wood pellets within the fire pot. The removable panel can also comprise a heat baffle and/or can be constructed of a heavier gauge of metal material. In other embodiments, the access panel can comprise a stone or ceramic material (e.g., with an increased and/or altered thermal mass and/or radiant heat performance compared to metal). Accordingly, the removable and/or replaceable access panel can alter the performance of the grilling device or system in some embodiments.

In certain embodiments, the access panel can have a solid and/or sealed configuration (e.g., such that heated air and/or smoke do not readily escape through the panel). In other embodiments, the access panel can include one or more openings (e.g., holes, perforations, slots, etc.) or other structural feature(s) to allow heated air and/or smoke to escape through the access panel. Escaping heat can improve the direct heating performance of the grilling device and/or allow the food product to cook faster in some embodiments. In some embodiments, the smoke circulation device and/or smoke retaining element can also include a sidewall. The sidewall can comprise one or more (opposing) side panels in certain embodiments. The side panel(s) can be contoured and/or configured (e.g., at a bottom edge thereof) to fit and/or correspond to the shape of the inner surface of the grilling device, oven section, internal grilling compartment, and/or sidewall thereof. Accordingly, the sidewall can comprise an at least partially rounded lower edge and/or rear edge in some embodiments. The sidewall and/or side panel(s) thereof can also include an opening therein. For instance, an opening in the sidewall and/or side panel(s) thereof can correspond and/or be configured to accommodate a portion of a grilling device heating component (e.g., an auger conduit extending from a wood pellet hopper to a fire pot).

In some embodiments, the chimney element can extend (e.g., vertically upward) from the smoke circulation device, smoke retaining element, and/or one or more portions thereof. For instance, the sidewall can have an at least partially angular and/or curved configuration such that a portion of the sidewall merges into and/or forms part of the chimney element. A portion of the upper surface can also comprise an at least partially angular and/or curved configuration such that a portion of the upper surface merges into and/or forms part of the chimney element. It will be appreciated, however, that the chimney element can comprise a separate structure and extend from the smoke circulation device, smoke retaining element, and/or one or more portions thereof without departing from the scope of this disclosure.

The sidewall of the smoke circulation device and/or smoke retaining element can also include a front panel and/or rear panel in some embodiments. In other embodiments, the (curved and/or circular) sidewall of the grilling device, oven section, and/or internal grilling compartment can provide and/or serve as a front panel and/or rear panel of the smoke circulation device and/or smoke retaining element. Accordingly, the smoke chamber can be at least partially bound by one or more portions of the smoke circulation device, smoke retaining element, grilling device, oven section, and/or internal grilling compartment.

One or more additional implementations of the present disclosure can include a smoke circulation system that includes a grilling device having an internal grilling compartment, and a smoke circulating element disposed at least partially within the internal grilling compartment. Further implementations can include a method of preparing a food product in a grilling device. Exemplary methods can include placing the food product in the internal grilling compartment of the grilling device with a smoke circulating element disposed therein and producing smoke within the internal grilling compartment such that the smoke circulating element directs the smoke to circulate within the internal grilling compartment.

Reference will now be made to the figures to describe various aspects of example embodiments of the disclosure. FIG. 1 depicts a smoke circulating element 100 according to an embodiment of the present disclosure. Smoke circulating element 100 includes a front panel 110 and opposing side panels 112 connected thereto. Each of opposing side panels 112 has a rounded bottom edge 114 and at least one side panel 112 has an opening 116 disposed therein. The opening 116 provides access to a smoke chamber 126 at least partially bound by smoke circulating element 100 and/or components thereof. In at least one embodiment, smoke circulating element 100 can have an opened back and/or bottom.

A rear portion of smoke circulating element 100 and/or side panels 112 thereof, opposite front panel 110, extends vertically upward. For instance, a top portion 124 (e.g., upper portion) of smoke circulating element 100 can include a front, substantially horizontal portion 128 and a (sloping and/or curved) rear wall or panel 118. Side panels 112 and/or a top edge thereof also curve from a front, substantially horizontal portion to a rear, substantially vertical portion. Front panel 110, front, substantially horizontal portion 128, and rear panel 118 are connected and/or disposed between opposing sidewalls 112.

Smoke circulating element 100 can comprise a smoke retaining element, comprising front panel 110, top portion 124 (e.g., front, substantially horizontal portion 128 and sidewalls 112), and/or rear panel 118, and also includes a smoke circulation opening 122. Smoke circulating element 100 also includes a substantially vertical chimney element 120 extending from rear panel 118 and/or disposed between the smoke retaining element and smoke circulation opening 122. In other embodiments, the smoke retaining element can also include chimney element 120. Chimney element 120 is disposed in the rear portion of smoke circulating element 100 and can be formed from a vertically extending portion of sidewall(s) 112 and a front chimney panel 121 extending and/or disposed therebetween. In other embodiments, chimney element 120 can comprise and/or be formed of alternative structure(s).

Figure 2:
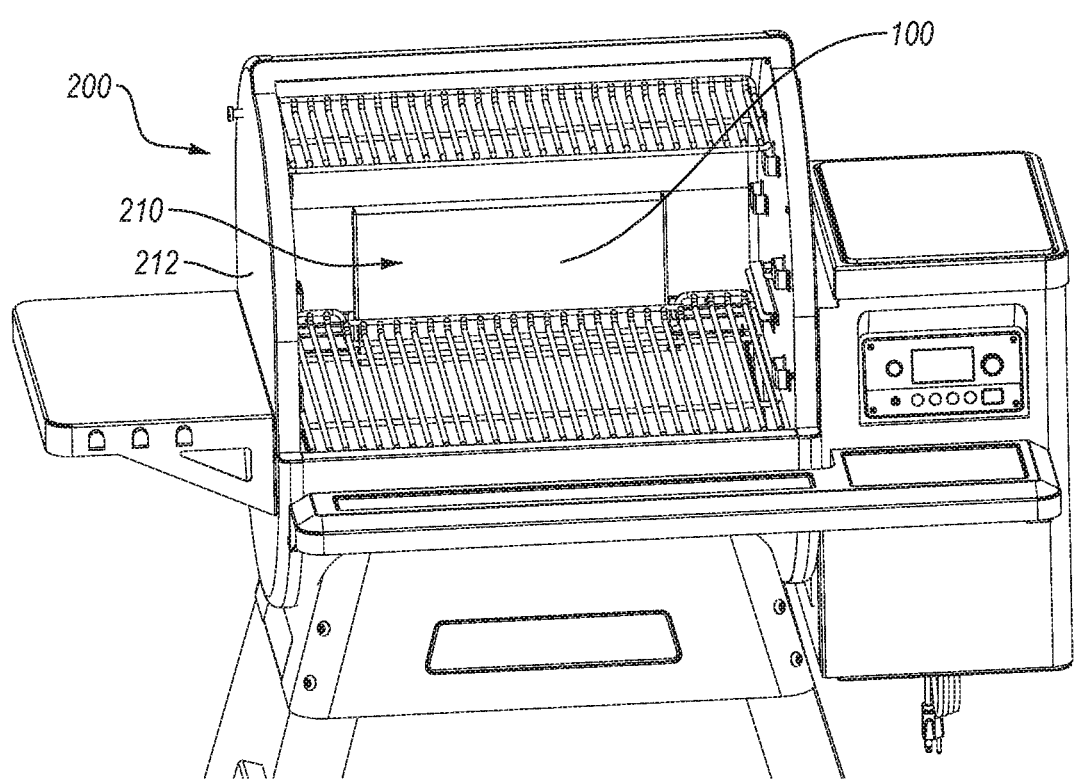
FIG. 2 illustrates a perspective view of the smoke circulating element of FIG. 1 disposed in a grilling device according to an implementation of the present disclosure.
Figure 3:
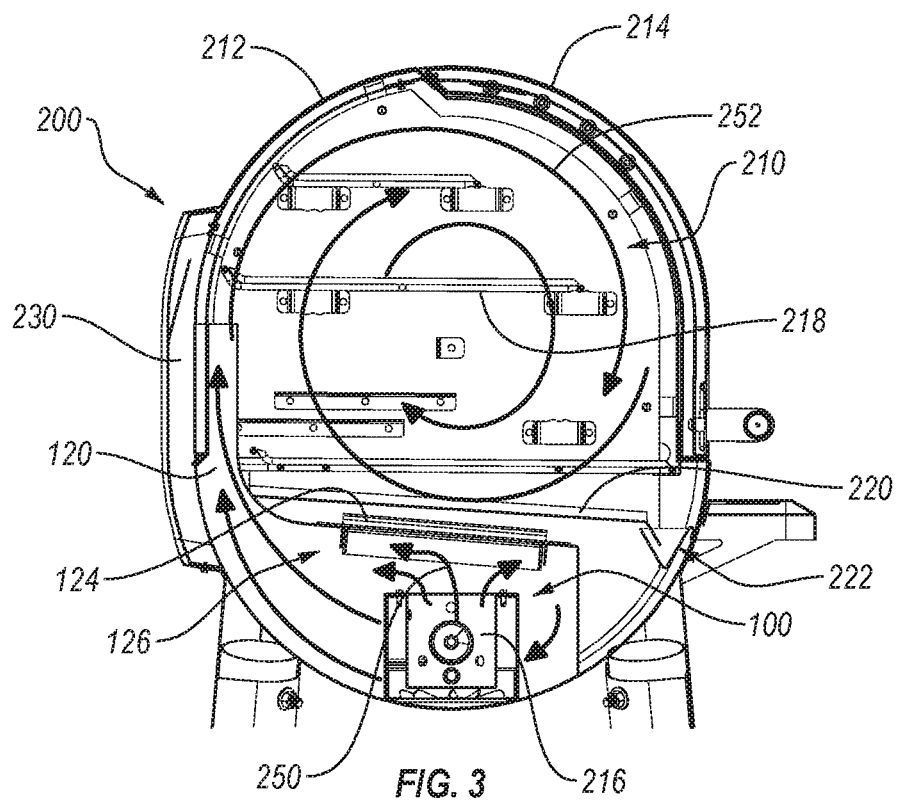
FIG. 3 illustrates a cross-sectional side view of the smoke circulating element of FIG. 1 disposed in a grilling device according to another implementation of the present disclosure.

FIG. 2 depicts smoke circulating element 100 disposed with an internal grilling compartment 210 of a grilling device 200. Grilling device 200 comprises a sidewall 212 at least partially bounding internal grilling compartment 210. A portion of smoke circulating element 100 (e.g., chimney element 120) extends vertically up a rear portion of (the inner surface of) sidewall 212. As illustrated in FIG. 3, grilling device 200 and/or sidewall 212 has a pill-shaped cross-sectional configuration. Accordingly, chimney element 120 extends vertically upward along an elongated and/or extended middle portion of the pill-shaped grilling device 200 and/or sidewall 212. The middle portion of the sidewall 212 can have a linear configuration in some embodiments.

FIG. 3 further depicts a heating element 216 disposed within a smoke chamber 126 of smoke circulating element 100. Heating element 216 can comprise a fire pot (e.g., configured to ignite a fuel source, such as wood pellets, to produce heat and/or smoke 250). Smoke 250 can also represent heated air in certain embodiments. In at least one embodiment, when smoke circulating element 100 is disposed within internal grilling compartment 210 of grilling device 200, sidewall 212 cooperates with components of smoke circulating element 100 to form and/or at least partially bound smoke chamber 126. Accordingly, smoke (and/or heated air) 250 can be captured and/or substantially contained within smoke chamber 126 for a period of time.

Captured smoke 250 can rise (via natural and/or forced air convection) out of smoke chamber 126 through chimney element 120 and into the cooking area of internal grilling compartment 210. The cooking area of internal grilling compartment 210 includes a plurality of grill racks 218 for receiving one or more food products thereon and a drip tray 220 for catching a food product discharge (e.g., grease, oil, food particles, char, seasoning, etc.) that falls through the grill racks 218. Drip tray 220 can also comprise a heat baffle for conducting and/or radiating heat from heating element 216. Drip tray 220 can be disposed at an angle within internal grilling compartment 210, as illustrated in FIG. 3, to allow the food product discharge to move (via gravity) to a discharge assembly 222 configured to remove the discharge from internal grilling compartment 210.

Grilling device 200 also includes a lid 214 that cooperates with sidewall 212 to at least partially bound and/or enclose internal grilling compartment 210. Accordingly, heated air and/or smoke 250 can be retained within internal grilling compartment 210 as circulating smoke and/or heated air 252. Circulating smoke and/or heated air 252 can continue to circulate and/or move within compartment 210 via natural and/or forced air convention. Heat generated by heating element 216 can also radiate from upper surface of the top portion 124 of smoke circulating element 100. The upper surface of the top portion 124 can also be sloped within compartment 210 (e.g., to substantially correspond to the slope of drip tray 220). A discharge assembly 222 having a series of troughs and/or conduits configured to transport discharge out of grilling device 200 can be connected to drip tray 220.

Figure 4:
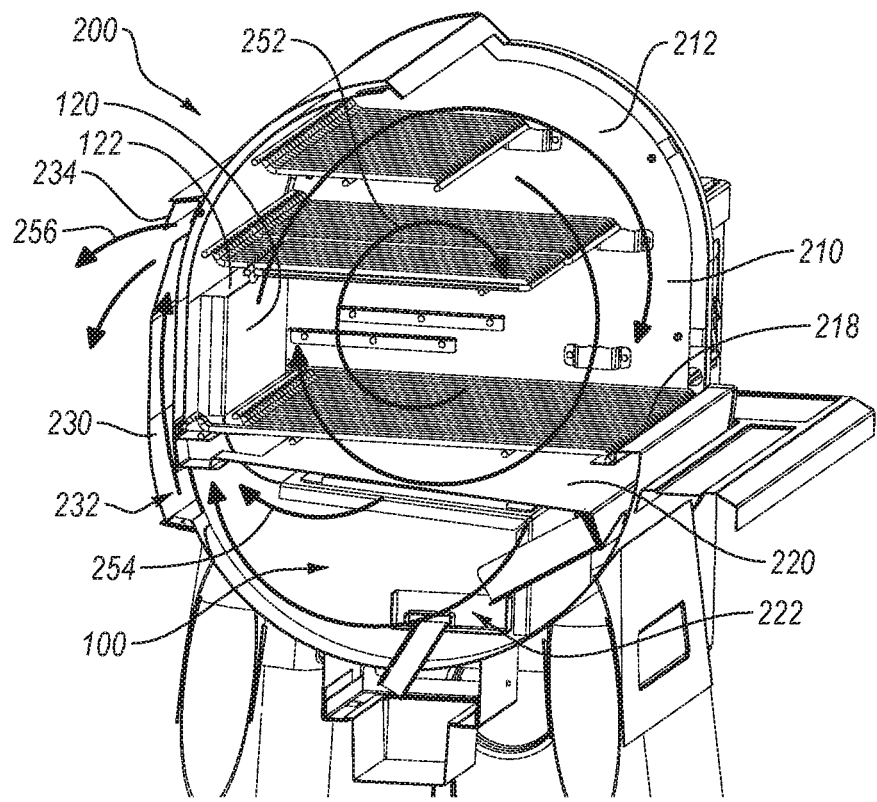
FIG. 4 illustrates a partial cutaway perspective view thereof of the smoke circulating element and grilling device of FIG. 3.

As further depicted in FIG. 4, circulating smoke 252 can cool and/or settle to the bottom of internal grilling compartment 210. For instance, settled smoke 254 can settle around the outside of smoke circulating element 100 and/or the smoke retaining element thereof. An exhaust opening 232 disposed below one or more grill rack 218, drip tray 220, and/or a portion (e.g., top portion 124) of smoke circulating element 100 can permit settled smoke 254 to escape internal grilling compartment 210. An exhaust chute 230 having an upper opening 234 (e.g., disposed above exhaust opening 232) can release exhausted smoke 256 from grilling device 200. Accordingly, heated air and/or smoke can circulate around the food product and cooled air and/or smoke can be exhausted. Thus, circulating smoke 252 can be hotter than exhausted smoke 256, allowing the food product to be prepared in the presence of heated air and/or smoke. This can also enhance the efficiency of operation of grilling device 200.

One or more grill racks 218 can also be configured to at least partially wrap around a portion of smoke circulating element 100. For instance, a rear edge of one or more grill racks 218 can have a recess corresponding to the shape and/or size of chimney element 120. The inner surface of sidewall 212 can have one or more support members for retaining grill rack 218 in a specific position. The support members can also be configured around a portion of smoke circulating element 100.

Figure 5:
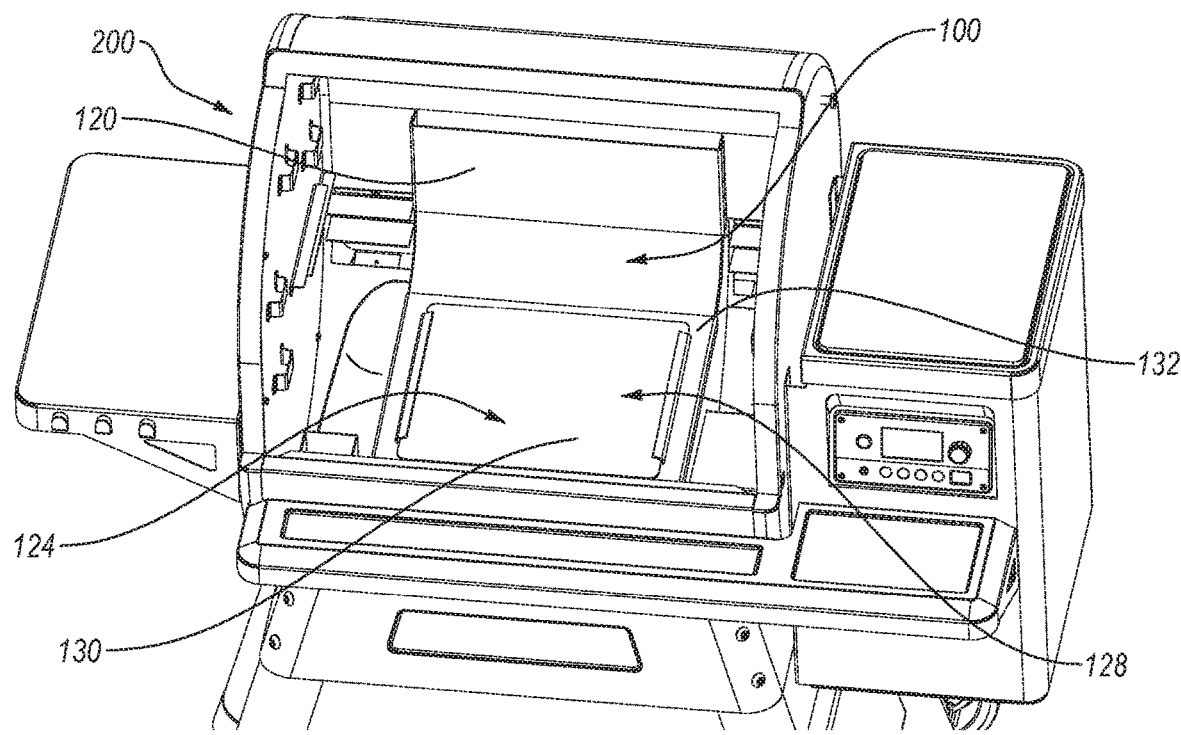
FIGS. 5 and 6 illustrate a perspective view of the smoke circulating element of FIG. 1 disposed in a grilling device with (FIG. 5) and without (FIG. 6) a removable panel according to another implementation of the present disclosure.
Figure 6:
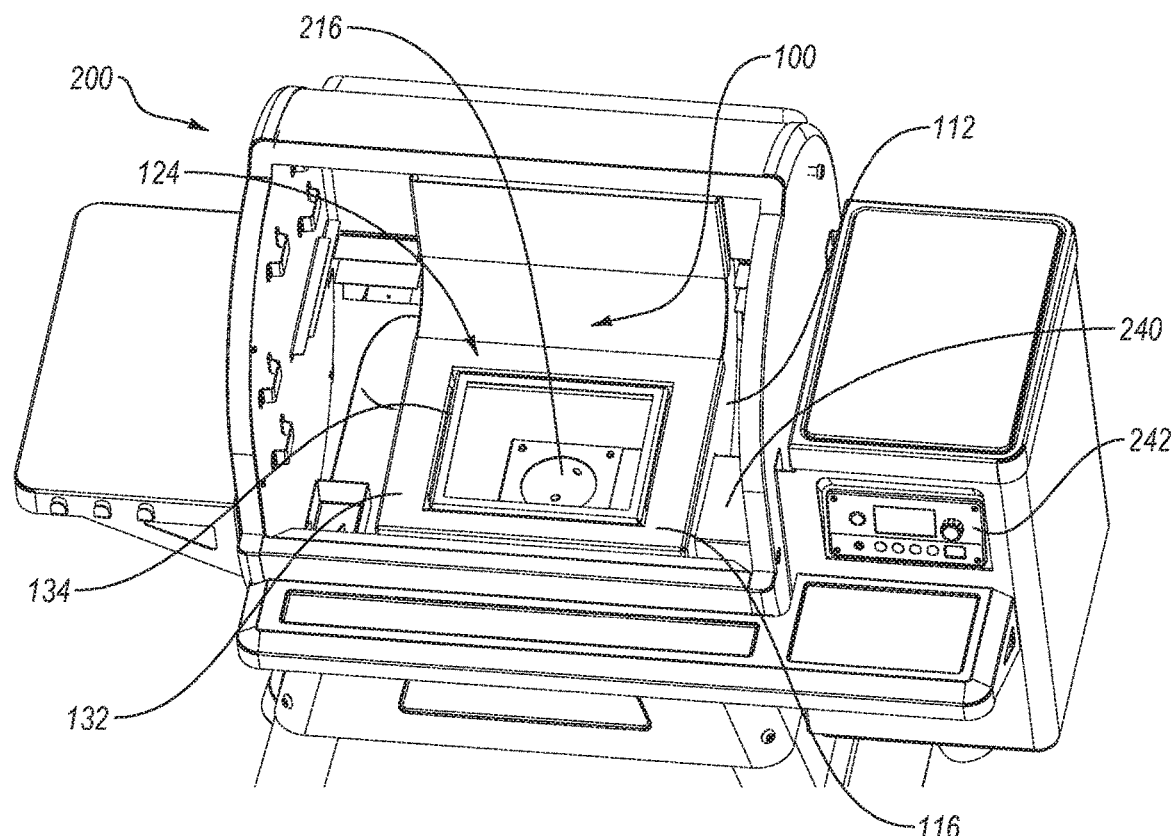

As illustrated in FIGS. 5 and 6, top portion 124 and/or horizontal portion 128 thereof comprises a removable panel 130 at least partially supported by a frame element 132 having an opening 134 disposed therein. Accordingly, the upper surface of top portion 124 can have an access opening 134 leading to heating element 216. Frame element 132 can at least partially support removable panel 130. In the removed configuration, heating element 216 can operate in a direct heating mode.

Opening 116 in sidewall 112 can correspond to the shape and/or size of an auger conduit 240 extending from wood pellet hopper 242 to heating element 216. Accordingly, wood pellets from hopper 242 can be transported by an auger within auger conduit 240 from wood pellet hopper 242 to heating element 216, where they are ignited and produce heat and/or smoke. The heated air and/or heated smoke 250 can escape directly through opening 134 when removable panel 130 is removed. However, with opening 134 covered with panel 130, heated air and/or heated smoke 250 can be captured in smoke chamber 126 of smoke circulating element 100 and/or rise up through chimney element 120 to escape via circulation opening 122. Circulating smoke and/or heated air 252 can cook, smoke, and/or otherwise prepare a food product disposed on grill racks 218 as it circulates within internal grilling compartment 210.

In an alternative embodiment, access panel 130 can be reversible. For instance, access panel 130 can be flipped over such that the upper surface thereof faces downward in an alternative configuration. The alternative configurations can provide alternative cooking features in certain embodiments. For instance, in one configuration, access panel 130 can seal opening 134 of smoke circulating element 100 (e.g., forcing smoke and heat to rise up the chimney element 120 thereof). In the alternative, "flipped" configuration, a gap can be disposed between removal panel 130 and frame element 132 of smoke circulating element 100. Such a configuration can allow heat (and/or smoke) to escape from heating element 216 (e.g., fire pot), through the gap between opening 134 and panel 130, to cook the food product more directly. For instance, the more concentrated heat (and/or smoke) 250 (see FIG. 3) can be routed to drip tray 220 for a more direct, radiant heat to the food product.

As circulating smoke and/or heated air 252 (FIG. 3) cools, it settles to the bottom of internal grilling compartment 210 and escapes grilling device 200 by means of exhaust opening 232, exhaust chute 230, and upper opening 234.

Figure 7:
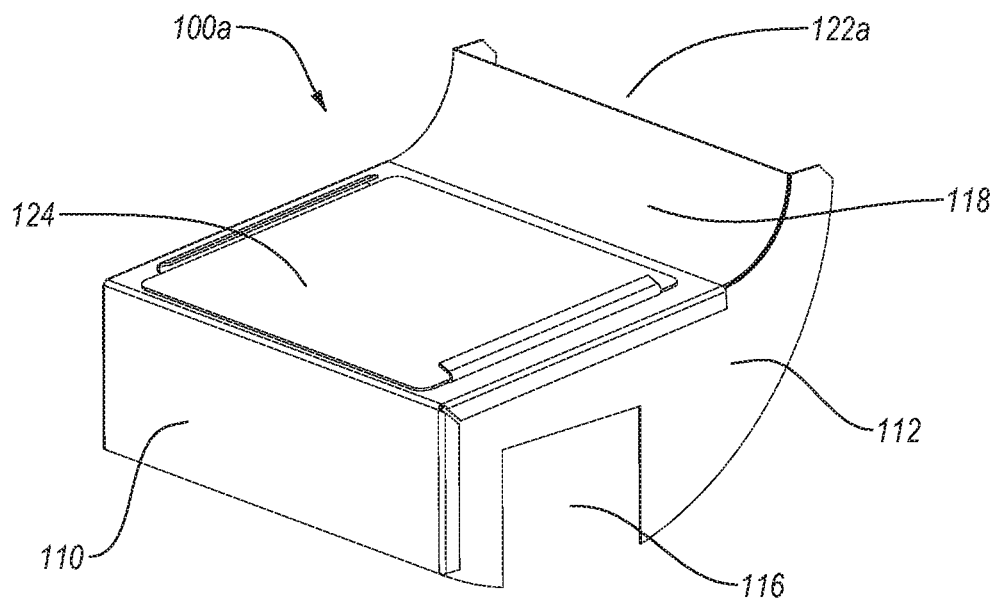
FIG. 7 illustrates a perspective view of another smoke circulating element according to an implementation of the present disclosure.
Figure 8:
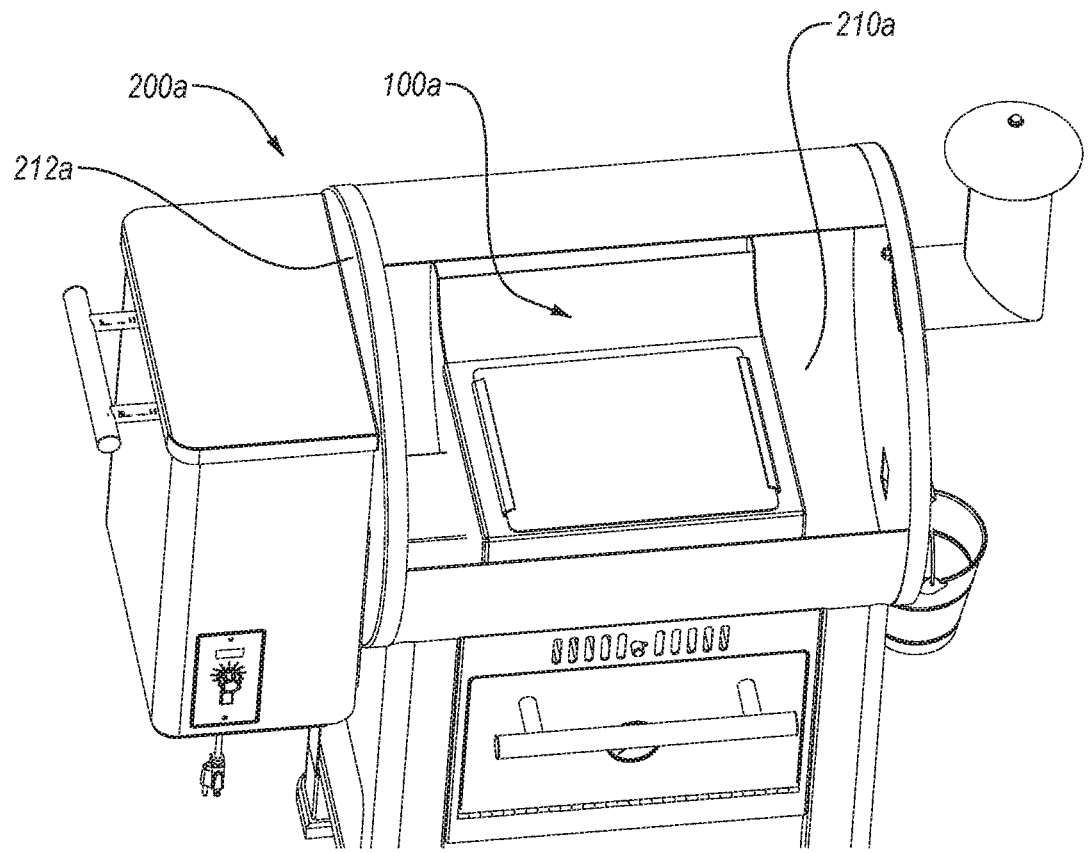
FIG. 8 illustrates a perspective view of the smoke circulating element of FIG. 7 disposed in a grilling device according to an implementation of the present disclosure.

FIG. 7 illustrates an alternative embodiment in which a smoke circulating element 100a does not include a vertically extending chimney element (extending from the top of sloping rear wall panel 118). Instead, a circulation opening 122a is disposed at the top of sloping rear wall panel 118. Otherwise, smoke circulating element 100a can be substantially similar to smoke circulating element 100. As depicted in FIG. 8, the removal of a vertically extending chimney element can allow smoke circulating element 100a to fit within an internal grilling compartment 210a of a grilling device 200a having a substantially circular sidewall 212a (e.g., without a vertically extending middle portion).

The foregoing detailed description makes reference to specific exemplary embodiments. However, it will be appreciated that various modifications and changes can be made without departing from the scope contemplated herein and as set forth in the appended claims. In particular, while illustrative exemplary embodiments in this disclosure have been more particularly described, the present disclosure is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description, which examples are to be construed as non-exclusive.

Moreover, any steps recited in any method or process described herein and/or recited in the claims may be executed in any order and are not necessarily limited to the order presented in the claims, unless otherwise stated (explicitly or implicitly) in the claims. Accordingly, the scope of the invention should be determined solely by the appended claims and their legal equivalents, rather than by the descriptions and examples given above.

It will also be appreciated that various features, members, elements, parts, and/or portions of certain embodiments of the present invention are compatible with and/or can be combined with, included in, and/or incorporated into other embodiments of the present invention. Thus, disclosure of certain features, members, elements, parts, and/or portions relative to a specific embodiment of the present invention should not be construed as limiting application or inclusion of said features, members, elements, parts, and/or portions to the specific embodiment. Rather, it will be appreciated that other embodiments can also include said features, members, elements, parts, and/or portions without necessarily departing from the scope of the present invention. Likewise, certain embodiments can include fewer features than those disclosed in specific examples without necessarily departing from the scope of this disclosure.

In addition, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A wood pellet grill and smoker, comprising:
a grilling device having walls defining an internal grilling compartment;
at least one grill rack located within the internal grilling compartment;
a heating element for heating wood pellets;
an exhaust opening configured to allow smoke to exit the internal grilling compartment; and
a smoke circulating element disposed at least partially within the internal grilling compartment over the heating element, at least a portion of the smoke circulating element disposed between the at least one grill rack and the heating element, the smoke circulating element comprising:
a chimney member adapted for directing smoke in a vertically upward direction within the internal grilling compartment, the chimney member comprising:
a top portion comprising:
a planar panel extending from a front of the internal grill compartment toward a rear of the internal compartment; and
a rear panel extending vertically upward from a rear edge of the planar panel; and
two opposing side panels attached to and extending downward from the planar panel and from the rear panel of the top portion; and
a front panel extending vertically downward from a front edge of the planar panel;
wherein the exhaust opening is disposed below the top portion of the smoke circulating element and adjacent at least one of the opposing side panels.

2. The wood pellet grill and smoker of claim 1, wherein the grilling device has an at least partially circular cross-sectional configuration such that smoke circulates within the internal grilling compartment.

3. The wood pellet grill and smoker of claim 1, wherein a portion of the smoke circulating element is contoured to correspond to a shape of the internal grilling compartment.

4. The wood pellet grill and smoker of claim 1, wherein the grilling device further comprises an exhaust chute extending in a vertically upward direction from the exhaust opening outside the internal grilling compartment.

5. The wood pellet grill and smoker of claim 4, wherein the exhaust chute comprises an opening at an upper end thereof.

6. The wood pellet grill and smoker of claim 1, wherein the smoke circulating element is a smoke retaining element.

7. The wood pellet grill and smoker of claim 6, wherein the smoke retaining element further comprises a front panel, and wherein the front panel, the two opposing side panels, and the top portion cooperate to at least partially define a smoke chamber.

8. The wood pellet grill and smoker of claim 6, wherein the smoke retaining element has a smoke circulation opening adapted for directing smoke out of the smoke retaining element.

9. The wood pellet grill and smoker of claim 8, wherein the rear panel comprises a sloping or curved panel extending vertically upward from the top portion.

10. The wood pellet grill and smoker of claim 9, wherein each of the two opposing side panels comprises an at least partially rounded lower edge.

11. The wood pellet grill and smoker of claim 9, wherein; the top portion further comprises a frame element disposed within an aperture extending through the planar panel and having an access opening extending therethrough; and
the smoke retaining element further comprises a panel member configured to selectively cover the access opening.

12. The wood pellet grill and smoker of claim 9, wherein at least one of the two opposing side panels comprises an opening to provide access to a smoke chamber through which a fuel can be supplied to the smoke chamber.

13. The wood pellet grill and smoker of claim 8, wherein:
the chimney member is in fluid communication with the smoke circulation opening; and
the chimney member is adapted for directing smoke in a vertically upward direction.

14. The wood pellet grill and smoker of claim 8, wherein each of the opposing side panels and the front panel rests on a bottom wall of the grill device.

15. A wood-pellet grill, comprising:

two elongated oval-shaped opposing side walls;

a contoured wall extending between the two elongated oval-shaped opposing side walls, wherein the two elongated oval-shaped opposing side walls and contoured wall at least partially define a cooking chamber;

a heat element disposed within a lower portion of the cooking chamber;

a smoke circulator disposed within the cooking chamber over the heating element, the smoke circulator comprising:

a planar panel disposed over the heat element and extending from a front of the cooking chamber toward a rear of the cooking chamber; and a rear panel extending vertically upward from a rear edge of the planar panel, the contoured wall and the rear panel at least partially defining a chimney;

opposing side panels attached to and extending downward from the planar panel and from the rear panel of the smoke circulator; and a front panel extend vertically downward from a front edge of the planar panel.

16. The wood-pellet grill of claim 15, wherein each of the opposing side panels and the front panel rests on the contoured wall of the grill device.

17. The wood-pellet grill of claim 15, wherein an outlet of the chimney is defined at a location above a mid-way point between an uppermost point of each elongated oval-shaped opposing side wall and a lowermost point of each elongated oval-shaped opposing side wall.

18. A wood-pellet grill, comprising:

two opposing side walls;

an outer-perimeter wall extending between the two opposing side walls, the outer-perimeter wall having an elongated-elliptical prism shape, the two opposing side walls and outer-perimeter wall defining an elongated-elliptical prism shaped cooking chamber;

a heat element disposed within a lower portion of the cooking chamber;

a smoke circulator disposed within the cooking chamber over the heating element, the smoke circulator comprising:

a planar panel disposed over the heat element; and a rear panel extending vertically upward from a rear edge of the planar panel, the outer-perimeter wall and the rear panel at least partially defining a chimney;

opposing side panels attached to and extending downward from the planar panel and from the rear panel of the smoke circulator; and a front panel extend vertically downward from a front edge of the planar panel.

19. The wood-pellet grill of claim 18, wherein the rear panel comprises:

a curved lower portion extending from the planar panel; and a planar upper portion, wherein the planar upper portion of the rear panel and the planar panel define an obtuse angle therebetween, and wherein both the planar upper portion of the rear panel and the planar panel are tangent to the curved lower portion of the rear panel.

\* \* \* \* \*

UNITED STATES PATENT AND TRADEMARK OFFICE
CERTIFICATE OF CORRECTION

| | | |
|---|---|---|
| PATENT NO. | : 10,694,892 B2 | Page 1 of 1 |
| APPLICATION NO. | : 15/316121 | |
| DATED | : June 30, 2020 | |
| INVENTOR(S) | : Michael Colston | |

It is certified that error appears in the above-identified patent and that said Letters Patent is hereby corrected as shown below:

In the Claims

| | | | |
|---|---|---|---|
| Claim 1, | Column 14, | Line 7 and 8, | change "the internal compartment" to --the internal grilling compartment-- |
| Claim 1, | Column 14, | Line 9, | change "planar panel; and" to --planar panel;-- |

Signed and Sealed this
Second Day of February, 2021

Drew Hirshfeld
*Performing the Functions and Duties of the
Under Secretary of Commerce for Intellectual Property and
Director of the United States Patent and Trademark Office*